United States Patent

Beckerer et al.

[11] 3,888,151
[45] June 10, 1975

[54] CUTTING APPARATUS FOR STRIP STOCK

[76] Inventors: Frank S. Beckerer; Frank S. Beckerer, Jr., both of c/o Beckson Manufacturing Inc., Box 3336, Bridgeport, Conn. 06604

[22] Filed: July 23, 1973

[21] Appl. No.: 382,079

[52] U.S. Cl. ............................ 83/411 A; 83/415
[51] Int. Cl. ............................................. B26d 7/06
[58] Field of Search....... 83/411 A, 411 R, 415, 703

[56] References Cited
UNITED STATES PATENTS

| | | | |
|---|---|---|---|
| 2,328,712 | 9/1943 | Domke | 83/411 A |
| 2,398,230 | 4/1946 | Keller | 83/411 A |
| 3,291,168 | 12/1966 | Zitner | 83/411 A |

FOREIGN PATENTS OR APPLICATIONS

| | | | |
|---|---|---|---|
| 1,279,262 | 11/1961 | France | 83/411 A |

*Primary Examiner*—Donald R. Schran
*Attorney, Agent, or Firm*—H. Gibner Lehmann; K. Gibner Lehmann

[57] ABSTRACT

An apparatus for cutting elongate strips of stock into pieces of predetermined length, the apparatus comprising a machine frame carrying a power-driven circular saw rotatable about an axis, and a turnably driven carrier member mounted for rotation about an axis parallel to that of the saw. The carrier member comprises a plurality of upright, holding tubes for receiving lengths of the strips to be cut, and has spring biased clamps adjacent the tubes for engaging lateral surfaces of the strips to hold the latter in place inside the tubes. As the carrier member rotates the clamps are momentarily released by fixed abutments carried on the frame, at which time the strips are advanced by gravity to predetermined lower positions defined by engagement of the ends of the strips with a stop means on the frame. As the carrier member continues to rotate, the clamps reengage the strips after which the latter are fed laterally into the blade of the saw to effect cut-off of a predetermined length. The cut-off piece is momentarily held by the carrier member and then deposited in a drop hole in the stop means. The arrangement is such that the elongate strips are first automatically advanced in the holding tubes to predetermined advanced positions and then are automatically cut to predetermined lengths. Upon completion of the cutting of an entire strip, a new length can be readily inserted in the respective holding tube and the process repeated. Multiple holding tubes are provided to facilitate large scale production.

3 Claims, 11 Drawing Figures

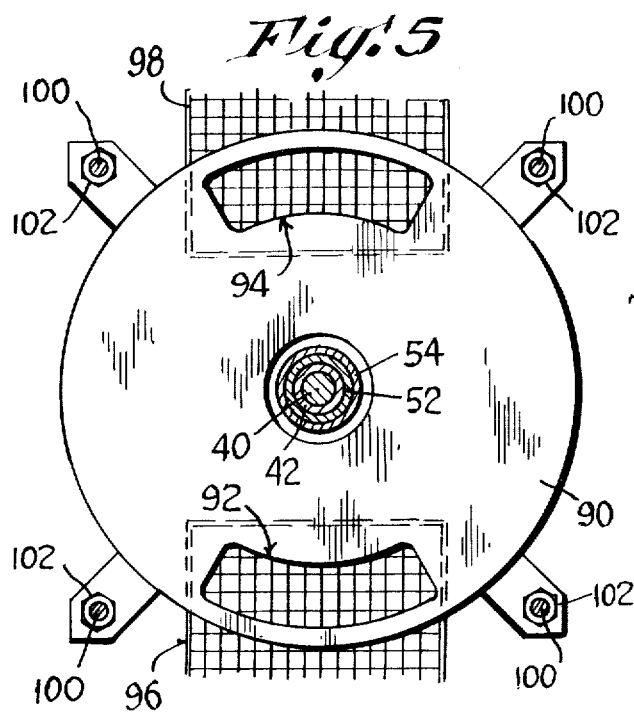
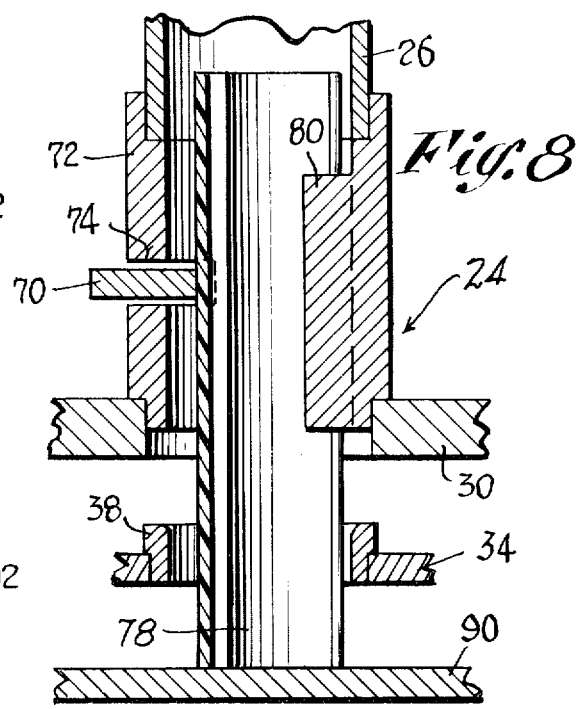
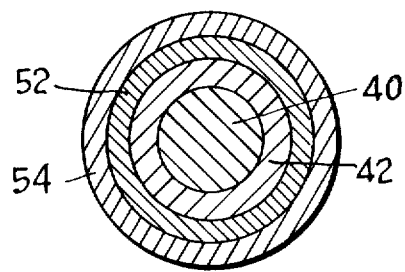
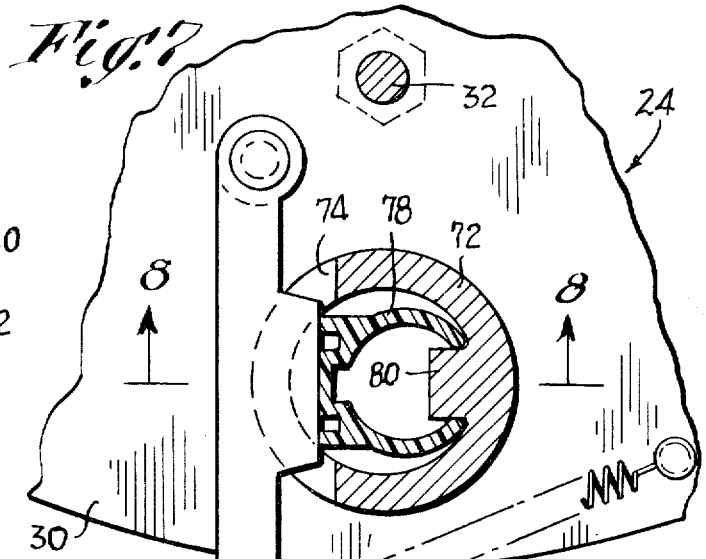
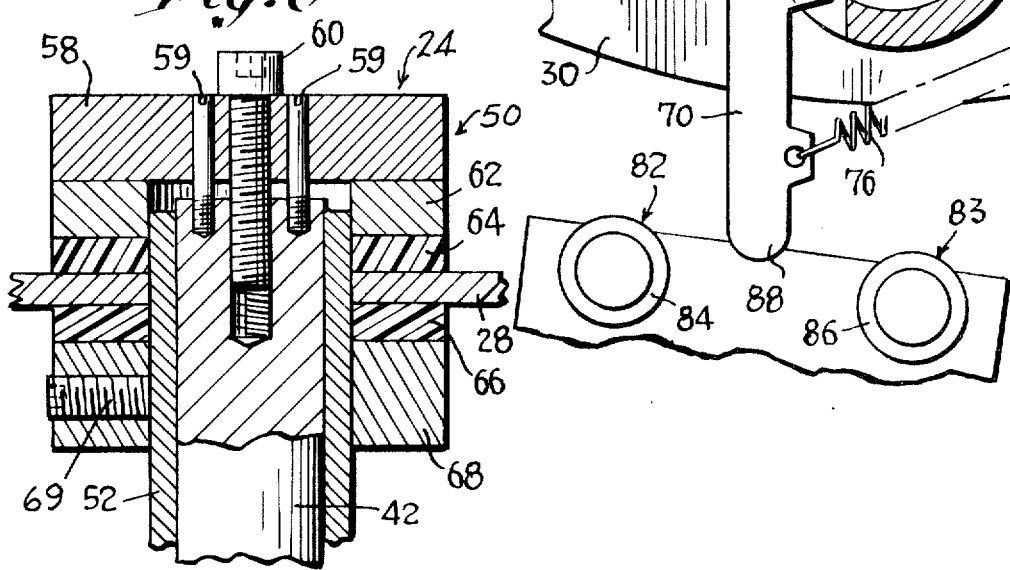

CUTTING APPARATUS FOR STRIP STOCK

BACKGROUND

This invention relates generally to devices for cutting lengths of strip stock into multiple pieces, and more particularly to automatic equipment for accomplishing the simultaneous feed and cutting of the same. Heretofore, the cutting of strips of stock has been effected on table saw devices by clamping lengths of the elongate material on a reciprocating carriage which was advanced with respect to a circular saw blade, so as to bring the stock into engagement with the blade and thereby effect the cutting. Several disadvantages existed in such equipment. The controls required for correct positioning of the carriage were frequently rather complex and resulted in abnormally high equipment cost and set-up time. In addition, there was frequently no means for momentarily holding the freshly cut piece; in some cases there was a likelihood of it becoming jammed in the blade and subsequently slung outwardly therefrom at great speed. Also, such equipment tended to be physically large and bulky, due to the complexity of the control apparatus employed for positioning the carriage.

SUMMARY

The above disadvantages and drawbacks of prior cutting devices are obviated by the present invention, which has for an object the provision of a novel and improved cutting apparatus which is especially simple in its construction, effective in operation and which requires but a minimum of attention by the operator. A related object is the provision of a cutting apparatus which can accommodate strips of widely varying cross sectional configurations and sizes, and which can automatically cut a multiplicity of such strips into pieces of predetermined length so as to effect a high-production rate. The above objects are accomplished by the combination of a power driven circular saw mounted on a machine frame, and an upright carrier member turnably mounted on the frame and rotatable about an axis substantially parallel to the axis of rotation of the saw blade. The carrier member comprises a plurality of holder tubes for receiving lengths of the stock to be cut, and has spring biased clamps which engage the lateral surfaces of the stock through transverse slots in the holding the As the carrier member rotates, the clamps successively are momentarily released by engagement with fixed abutments on the frame, and the stock is allowed to drop by gravity to advanced positions with respect to the carrier member. Continued rotation of the latter brings the advanced stock into engagement with the saw blade to effect the cutting. The cut piece is temporarily held by another part of the carrier member and is deposited through a drop-hole into a storage bin. Multiple holding tubes and clamps are provided for simultaneously accommodating large numbers of strips on a single carrier member, to effect a high production rate.

Other features and advantages will hereinafter appear.

In the drawings, illustrating several embodiments of the invention:

FIG. 5 is a horizontal section taken on line 5—5 of FIG. 1.

FIG. 6 is an enlarged fragmentary horizontal section taken on line 6—6 of FIG. 1, through the center drive shafts.

FIG. 7 is a fragmentary view partly in horizontal section and partly in top plan of one holder tube and clamp assembly of the carrier members of FIGS. 1-3.

FIG. 8 is a section taken on line 8—8 of FIG. 7.

FIG. 9 is a vertical sectional view of the friction drive clutch of the embodiment of FIGS. 1-8.

Figure 1:
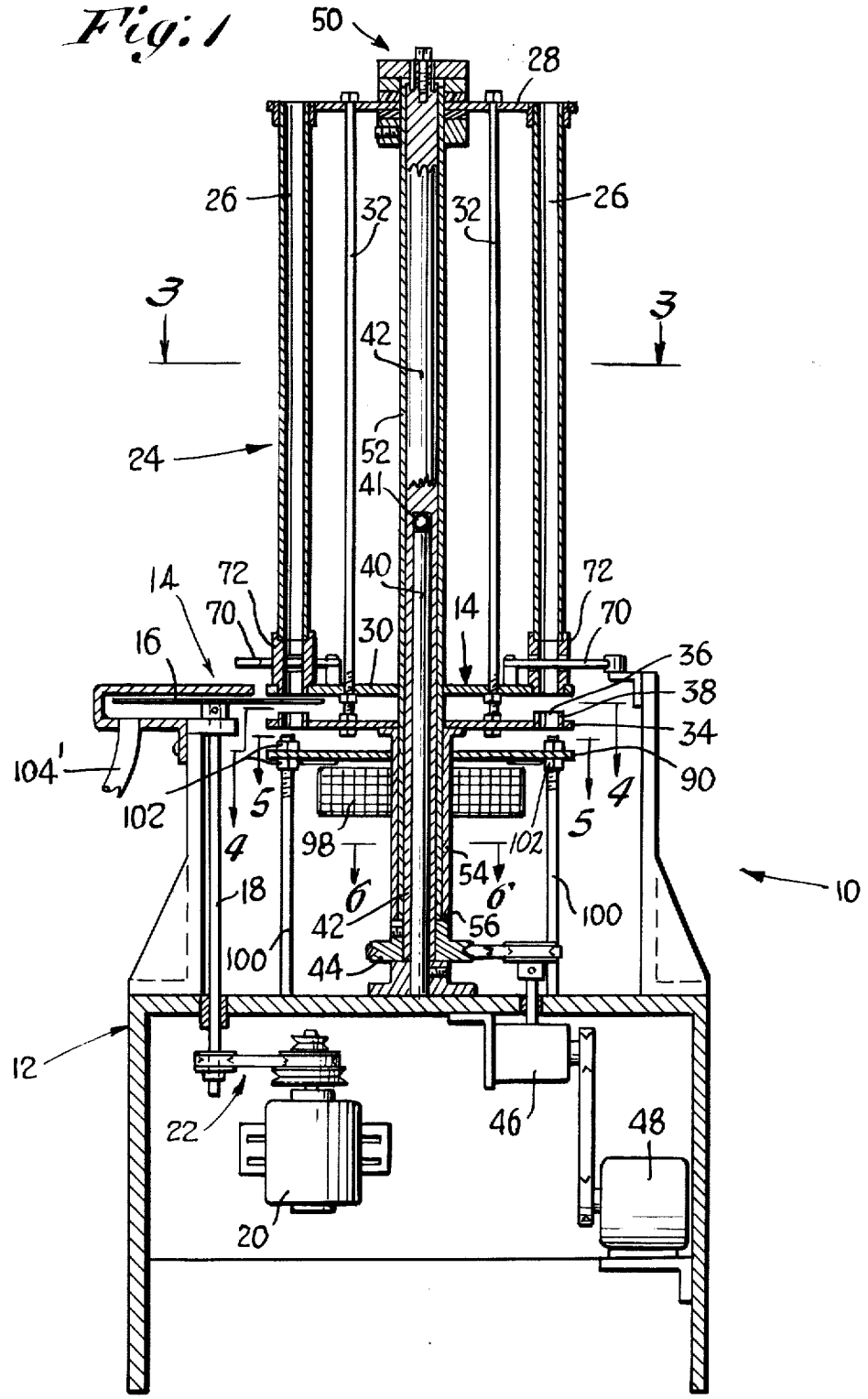
FIG. 1 is a vertical sectional view of the cutting apparatus of the present invention.
Figure 2:
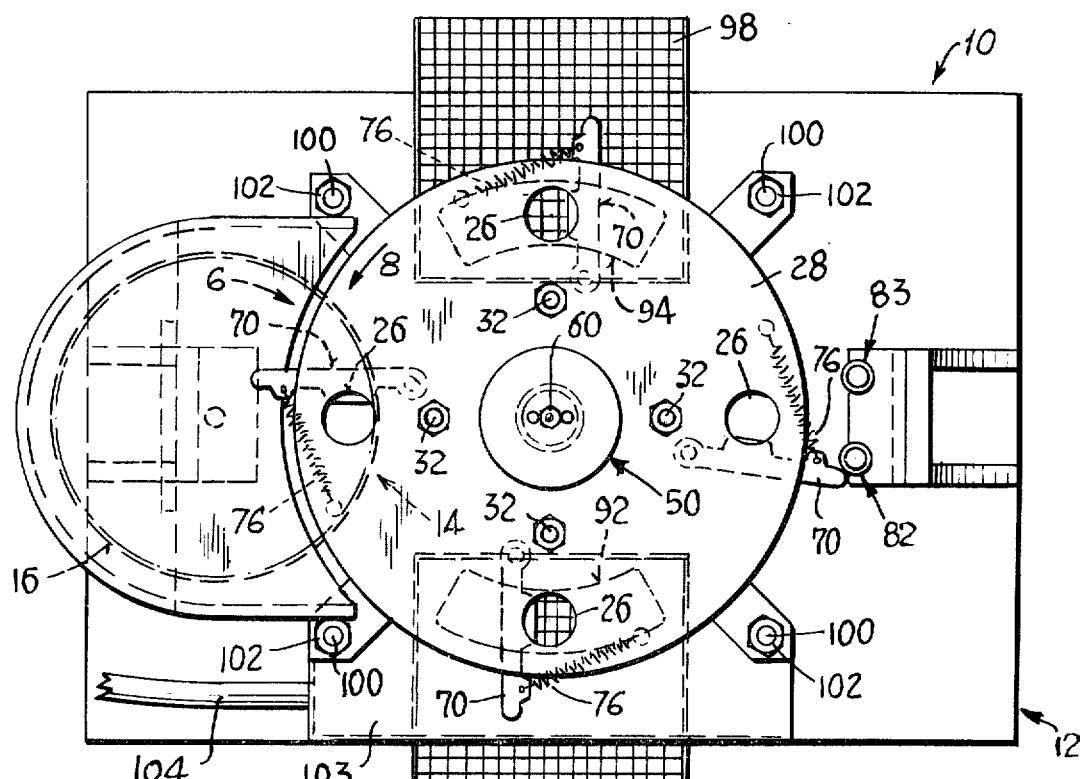
FIG. 2 is a top plan view of the cutting apparatus shown in FIG. 1.

Referring first to FIGS. 1 and 2 there is illustrated a strip stock cutting apparatus generally designated by the numeral 10, comprising a machine frame 12, which includes a work performing station 14. A circular saw blade 16 is turnably mounted on the frame by means of a drive shaft 18 and powered by an electric motor 20 through a conventional belt and pulley arrangement 22. The saw is adapted to lie in a substantially horizontal plane and rotate about a vertical axis in the direction indicated by the arrow 6 in FIG. 2.

Figure 4:
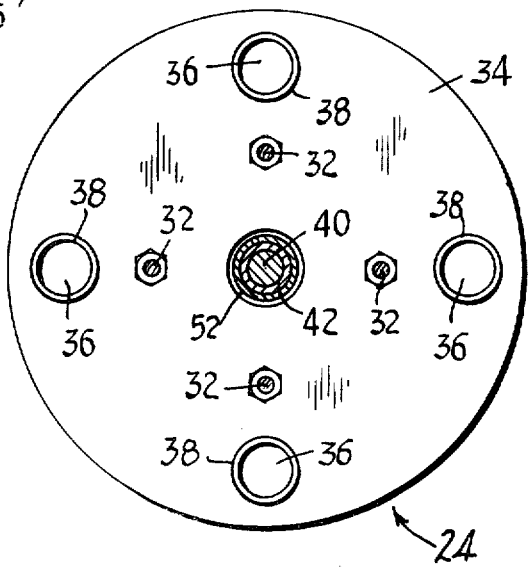
FIG. 4 is a horizontal section of the carrier member, taken on line 4—4 of FIG. 1.

In accordance with the present invention there is provided a carrier member generally designated by the numeral 24 mounted for turning movement on the frame about an axis substantially parallel to the axis of rotation of the saw blade 16. The carrier member 24 comprises a plurality of upright holding tubes or holder devices 26 which are rigidly secured between two flat plates 28 and 30. The plates are held together by multiple rods 32 which clamp the tubes 26 lengthwise and enable the assembly to move as a single unit. The carrier member further includes an apertured plate 34 (shown particularly in FIG. 4) having multiple holes 36 respectively in alignment with the holding tubes 26. The holes are provided with bushings 38 to provide guides for the pieces which have just been cut, as will be explained below. The rods 32 extend through the plate 30 and also through the apertured plate 34, such that the latter is rigid with the plates 28, 30 and with the holding tubes 26.

Referring for the moment to FIGS. 1-6, it can be seen that the carrier member is turnably mounted on the frame 12 by means of two concentric tubes and a pipe disposed therein. The pipe 40 is rigidly mounted on the frame and constitutes a support for the carrier member. A ball bearing 41 disposed at the end of pipe 40 supports the axial load of the tube 42. As shown in FIG. 1, the tube 42 is solid for the portion of its length above the ball bearing 41, and near its lower end carries a pulley 44 which is driven (through a speed reducing gear box 46) by a second motor 48. This tube 42 extends upward through the carrier member to the friction clutch drive 50, which will be discussed below. The outer tube 52 is rigid with respect to the plates 28, 30 and holding tubes 26 and rotates therewith. In FIGS. 1 and 6, there is shown a sleeve 54 having a bearing 56 which rests upon the pulley 44 and supports the axial load or weight of the carrier member 24.

Referring to FIG. 9, the details of the friction drive clutch can be seen. The smaller diameter tube 42 extends upwards through the plate 28 and butts against an end plate 58 which is keyed to the tube 42 by means of two pin screws 59. The tube 42 (functioning as a shaft) is solid for the upper several inches, and the screws are threaded into tapped holes in the solid portion as shown. An adjustment screw 60 is also threaded into this solid end of tube 42. A spacer bushing 62 is disposed against the end plate 58, and the plate 28 of the carrier member is sandwiched between two teflon rings 64, 66, with the ring 66 engaging a collar 68 rigidly affixed to the outer tube 52 by means of a set screw 69. It will be readily understood that by tightening the adjustment screw 60, the frictional engagement between the end plate 58 and the carrier member plate 28 (and collar 68) is increased. The arrangement is such that the inner tube 42 can be driven at a constant speed (by pulley 44), while the outer tube 52 (and carrier member 24) undergo periodic slippage during the cutting process, as will be explained below.

Figure 3:
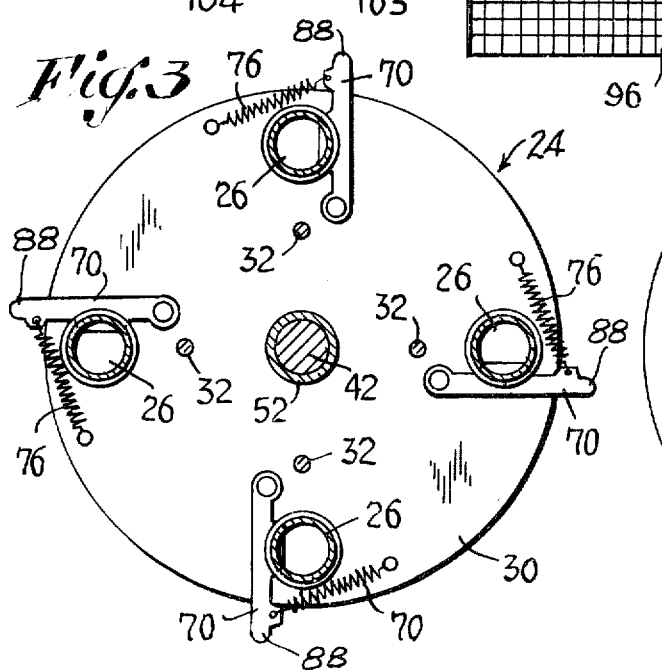
FIG. 3 is a horizontal section of the carrier member, taken on line 3—3 of FIG. 1.

Referring now to FIGS. 3, 7 and 8, in accordance with the present invention there is provided a plurality of clamps 70 and profile-insert members 72 disposed on the plate 30 of carrier member 24. The insert members 72 have a tubular configuration and include lateral clearance slots 74 communicating with the bores of each member, respectively. The arrangement is such that through these clearance slots, the clamps can engage the lateral surfaces of the strips to be cut. Springs 76 attached to the ends of the clamps and to the plate 30 normally bias the clamps to positions in engagement with the strips. FIG. 7 shows a typical strip 78 in the form of a plastic extrusion as it would be frictionally held by one of the profile insert members. An internal positioning lug 80 having spaced apart shoulders is also provided to help orient the strip in a particular manner for the cutting operation. As seen in FIG. 7, the spaced shoulders of the lugs 80 engage the longitudinal edges of longitudinal slits in the strips of plastic stock 78.

Referring to FIG. 2 and 7, and in accordance with the present invention there is provided a novel and improved means for insuring complete, reliable downward advance of the strip stock 78, said means comprising a pair of fixed abutments 82 and 83 carried on the frame 12, for momentarily swinging seriatim the clamps to a position out of engagement with the strips of stock to enable the latter to advance fully by gravity to advanced positions. The fixed abutments are in the form of ball bearings 84, 86 which successively engage the tapered ends 88 of the clamps 70 as shown in FIG. 7. The abutment 83 is seen to be downstream, so to speak, from the abutment 82 considering the direction of rotation of the carrier 24. The advanced position of a strip is defined by the engagement of the end of the strip with an adjustable stop means in the form of an abutment plate 90 as illustrated in FIG. 8. The abutment plate 90 has two drop holes 92, 94 and two wire mesh chutes 96, 98 leading to storage bins or the like (not shown). The position of the plate 90 is adjustable with respect to the frame 12 and the carrier member 24 by means of four threaded rods 100, and eight nuts 102, two disposed on each rod on opposite sides of the plate 90.

The operation of the improved cutting apparatus can now be understood by referring to FIGS. 1–9. In the embodiment shown, a total of four elongate pieces of strip stock can be accommodated by insertion through the upper open ends of the four corresponding holder tubes 26, respectively. However, additional holding tubes could readily be employed, subject to limitations of space. A carrier member employing four tubes has been shown for simplicity and clarity. First, the clamps 70 are momentarily manually released to enable the strips to be positioned as shown in FIG. 7, with the lower ends of the stock roughly flush with the bottom of plate 30. The motors 20 and 48 are then activated. Referring to FIG. 2, as the carrier member 24 rotates, each clamp 70 successively engages the abutment 82 which momentarily releases the clamp and enables the strip to advance or fall by gravity through the corresponding aligned hole 38 in the plate 34, and into engagement with the abutment plate 90. The strip 78 shown in the holder tube 26 of FIG. 8 is in this advanced position. Upon continued rotation of the carrier member 24 in the direction indicated by the arrow 8, the clamp 70 passes the abutment 82 and now engages the abutment 83 which provides a second release of the clamp. This is sometimes required to insure a full advanced of the strip. Under certain circumstances, after the first clamp is released the strip bounces or oscillates against the abutment plate 90. Occasionally, the clamp 70 reengages the strip while it is still undergoing oscillating movement with the result that it is reclamped in a somewhat less than fully-advanced position. After passing the second abutment 83, the clamp re-engages the strip and the latter is carried thereafter into lateral engagement with the blade of the saw 16.

In accordance with the present invention, as illustrated in FIG. 2, the direction of rotation of the carrier member is opposite to that of the saw blade as viewed from the top side of the latter. This is indicated by the arrows 6 and 8 in FIG. 2. We have found that such an arrangement yields unobvious and especially satisfactory results. Reversal of the direction of the saw has been found to cause excessive heating of the blade, a lower quality cut, and a tendency for the teeth of the blade to fill up with material. It should be noted that the friction clutch drive is adjusted to provide sufficient drive force to the carrier member to effect the engagement of the strip and saw blade. The carrier member normally revolves at a rate of from 7 to 10 revolutions per minute, and momentarily slows somewhat during the cutting process. Referring to FIG. 5, the recently cut pieces are advanced along the abutment plate 90 by the plate 34 to the location of the drop hole 92, at which time the piece falls to a wire chute 96 and a storage bin (not shown). An additional drop hole 94 is provided, which latter collects the unused remainder of the strip when the last cut thereon has been affected. This occurs when the clamp 70 is released and the length of the remaining section is short; the section advances until it engages the abutment plate 90 (at which time it remains free of the clamp) and is carried to the drop hole 94 and deposited through chute 98 into a separate bin. A vacuum canister 103 and vacuum hose 104 remove dust resulting from the cutting operation. Thus, as each holder tube 26 passes the abutments 82 and 83, the strips are advanced by gravity to predetermined advanced positions, and are successively brought into engagement with the saw blade 16 to be cut; the cut pieces are then advanced by means of the plate 34 to the drop hole 92, for deposit through wire chute 96 into a storage bin. It will be understood that the length of the pieces cut can be varied by adjustment of the position of the abutment plate 90 (FIGS. 1 and 5).

Figure 11:
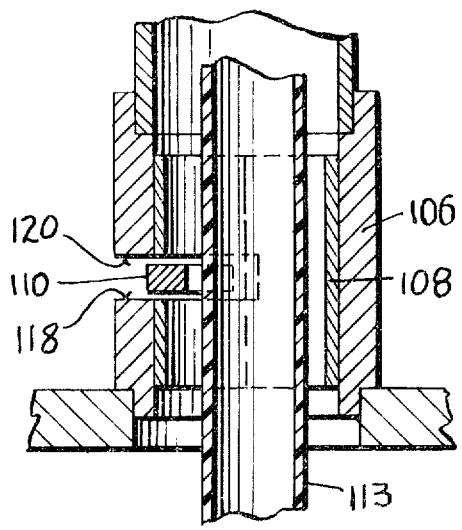
FIG. 11 is a section taken on line 11—11 of FIG. 10.
Figure 10:
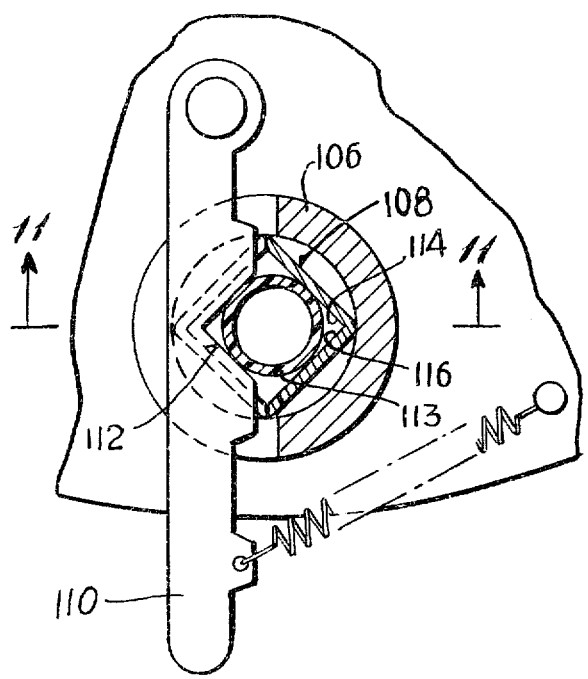
FIG. 10 is a fragmentary vertical section of a modified holder tube and clamp assembly, constituting another embodiment of the invention.

Another embodiment of the invention is illustrated in FIG. 10 which shows partly in section and partly in elevation a modified holding tube 106 having a tubular insert member 108 which can be hollow having rectangular or square cross section, and a modified clamp 110 having a V-shaped cut out portion 112. This configuration is adapted for holding stock 113 having a circular cross section, and has the advantage of being able to accommodate tubing of different diameters. The insert member 108 has a plurality of planar inner surfaces 114, 116 for supporting the tubing to be cut. As illustrated in FIGS. 10 and 11, both the holder tube 106 and the insert member 108 have lateral clearance slots 118 and 120, respectively, for accommodating the clamp 110 when the latter engages the lateral surface of the tubing to be cut. The arrangement is such that the tubing to be cut is always held at four points, two of these being the points of engagement of the tubing with surfaces 114 and 116, and the other two being the points of engagement of the tubing with the V cut-out 112. The operation of this embodiment is otherwise similar to that of FIGS. 1–9 and thus need not be repeated.

From the above it can be seen that we have provided a novel and improved cutting apparatus for elongate strips of stock, the apparatus being simple in construction and effective in operation, and which requires an absolute minimum of attention during operation. The unit is fully automatic and is especially well suited to large scale production. It thus represents a distinct advance and improvement in cutting machine technology.

Variations and modifications are possible without departing from the spirit of the invention.

We claim:

1. An apparatus for cutting elongate strips of stock into pieces of predetermined length, comprising in combination:
   a. a machine frame having an operation-performing station,
   b. a saw carried by said frame at said station,
   c. powered means for driving said saw,
   d. a carrier member,
   e. means mounting said carrier member for turning movement on said frame about an axis,
   f. a plurality of holder devices including clamps disposed on said carrier member for releasably holding strips of stock to be cut, said strips of stock being advanceable in directions substantially parallel to said axis when the clamps are released,
   g. stop means for limiting the advance to predetermined positions of said strips of stock when the latter are released,
   h. said carrier member advancing the holder devices seriatim to said operation-performing station so as to feed the strips of stock laterally into the blade of the saw as the carrier member undergoes turning movement,
   i. said clamps automatically releasing the strips of stock after each cutoff to present fresh portions for subsequent cutting,
   j. powered means for turnably driving said carrier member, and
   k. a friction clutch drive disposed between said carrier member and said powered means, said drive being adapted to slip a predetermined extent in response to the load imposed on the carrier member occasioned by the normal cutting operation of the saw in severing the strips of stock.

2. An apparatus for cutting elongate strips of stock into pieces of predetermined length, comprising in combination:
   a. a machine frame having an operation-performing station,
   b. a saw carried by said frame at said station,
   c. powered means for driving said saw,
   d. a carrier member,
   e. means mounting said carrier member for turning movement on said frame about an axis,
   f. a plurality of holder devices including clamps disposed on said carrier member for releasably holding strips of stock to be cut, said strips of stock being advanceable in directions substantially parallel to said axis when the clamps are released,
   g. stop means for limiting the advance to predetermined positions of said strips of stock when the latter are released,
   h. said carrier member advancing the holder devices seriatim to said operation-performing station so as to feed the strips of stock laterally into the blade of the saw as the carrier member undergoes turning movement,
   i. said clamps automatically releasing the strips of stock after each cutoff to present fresh portions for subsequent cutting,
   j. said holding devices comprising a plurality of upright holding tubes for supporting elongate lengths of strips of stock in vertical positions,
   k. said tubes having cut-out portions in their side walls respectively,
   l. a plurality of clamp arms pivotally carried on said carrier member, said arms being respectively receivable in said cutout portions of the tubes so as to frictionally engage and yieldably hold the strips of stock contained therein,
   m. spring means biasing said arms into engagement with said strips of stock carried in the respective holding tubes,
   n. a fixed abutment carried on said frame and engageable with said clamp arms for momentarily swinging the latter to a position out of engagement with the strips of stock in the holding tubes, thereby enabling the strips to advance in the tubes by means of gravity,
   o. an additional abutment carried on said frame and disposed adjacent and downstream from the first abutment when considering the direction of turning of the carrier member, said additional abutment being adapted for engaging the clamp arms after the latter snap past said first abutment, so as to again momentarily swing the clamp arms out of engagement with the strips of stock in the holding tubes, thereby insuring complete advance of the strips of stock to predetermined fully advanced positions.

3. An apparatus for cutting elongate strips of stock into pieces of predetermined length, comprising in combination:
   a. a machine frame having an operation-performing station, b. a saw carried by said frame at said station,
c. powered means for driving said saw,
d. a carrier member,
e. means mounting said carrier member for turning movement on said frame about an axis,
f. a plurality of holder devices including clamps disposed on said carrier member for releasably holding strips of stock to be cut, said strips of stock being advanceable in directions substantially parallel to said axis when the clamps are released,
g. stop means for limiting the advance to predetermined positions of said strips of stock when the latter are released,
h. said carrier member advancing the holder devices seriatim to said operation-performing station so as to feed the strips of stock laterally into the blade of the saw as the carrier member undergoes turning movement,
i. said clamps automatically releasing the strips of stock after each cutoff to present fresh portions for subsequent cutting,
j. said holding devices comprising a plurality of upright holding tubes for supporting elongate lengths of strips of stock in vertical positions,
k. said tubes having cut-out portions in their side walls respectively,
l. a plurality of clamp arms pivotally carried on said carrier member, said arms being respectively receivable in said cutout portions of the tubes so as to frictionally engage and yieldably hold the strips of stock contained therein,
m. spring means biasing said arms into engagement with said strips of stock carried in the respective holding tubes,
n. said holding tubes having longitudinal bores respectively, and
o. positioning lugs disposed on the inner surfaces of the tubes and projecting into said bores respectively, said lugs having spaced apart shoulders adapted to engage edges of longitudinal slits in the strips of stock being cut,
p. the strips of stock being releasably held between said clamps and said positioning lugs.

* * * * *